US009985435B2

(12) United States Patent
de Hoog et al.

(10) Patent No.: US 9,985,435 B2
(45) Date of Patent: May 29, 2018

(54) POWER SHARING FOR DC MICROGRIDS

(71) Applicant: International Business Machines Corporation, Armonk, NY (US)

(72) Inventors: Julian de Hoog, Melbourne (AU); Ramachandra R. Kolluri, Melbourne (AU); Frank Suits, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 14/971,855

(22) Filed: Dec. 16, 2015

(65) Prior Publication Data
US 2017/0180006 A1 Jun. 22, 2017

(51) Int. Cl.
*H02J 1/10* (2006.01)
*H02J 1/14* (2006.01)
*H04B 3/54* (2006.01)

(52) U.S. Cl.
CPC ............... *H02J 1/10* (2013.01); *H02J 1/102* (2013.01); *H02J 1/14* (2013.01); *H04B 3/548* (2013.01); *H02J 2001/106* (2013.01); *Y02E 40/72* (2013.01); *Y02P 80/14* (2015.11)

(58) Field of Classification Search
CPC ...... H02J 1/14; H02J 1/10; H02J 1/102; H02J 2001/106; Y02P 80/14; Y04S 10/12
See application file for complete search history.

(56) References Cited

U.S. PATENT DOCUMENTS

| 8,553,437 | B2 * | 10/2013 | Berggren | ................ | H02J 1/102 |
| | | | | | 363/34 |
| 2004/0051387 | A1 | 3/2004 | Lasseter et al. | | |
| 2012/0259477 | A1 | 10/2012 | Abido et al. | | |
| 2014/0097683 | A1 | 4/2014 | Plyabongkarn et al. | | |
| 2014/0249686 | A1 | 9/2014 | Brainard et al. | | |
| 2015/0130277 | A1 | 5/2015 | Ballantine et al. | | |

(Continued)

FOREIGN PATENT DOCUMENTS

| GB | 2482114 A | 1/2012 |
| WO | WO2011109514 A1 | 9/2011 |
| WO | WO2014125279 A2 | 8/2014 |

OTHER PUBLICATIONS

A. Mukherjee, "Case Study of Islanded Microgrid Control," (2012) (90 pages).

(Continued)

*Primary Examiner* — Ryan Johnson
(74) *Attorney, Agent, or Firm* — Louis J. Percello; Michael J. Chang, LLC

(57) ABSTRACT

Techniques for power sharing in DC networks using virtual impedance frequency droop control are provided. In one aspect, a method for power sharing in a DC network having multiple electrical energy generation sources connected to at least one load includes the steps of, at each of the electrical energy generation sources: generating a controllable DC voltage; superimposing a controllable AC signal on top of the DC voltage; regulating the AC signal using virtual impedance frequency droop control; and determining a desired DC voltage output using the regulated AC signal. The DC voltage can then be regulated to match the desired DC voltage output. A system for power sharing in a DC network is also provided.

20 Claims, 3 Drawing Sheets

(56) References Cited

U.S. PATENT DOCUMENTS

2016/0336746 A1* 11/2016 Cheng ............... H02J 1/12
2017/0077707 A1* 3/2017 Zimmanck ............... H02J 3/18

OTHER PUBLICATIONS

Loh et al., "Autonomous control of interlinking converter with energy storage in hybrid AC-DC microgrid," IEEE Transactions on Industry Applications, 49, No. 3 (May/Jun. 2013): 1374-1382.

Singh et al., "DC Microgrids and the Virtues of Local Electricity," IEEE Spectrum (posted Feb. 2014) 6 pages.

Schiffer et al., "A Consensus-Based Distributed Voltage Control for Reactive Power Sharing in Microgrids," 13th European Control Conference (ECC), pp. 1299-1305, Strasbourg, France (Jun. 2014).

Simpson-Porco et al., "Synchronization and power sharing for droop-controlled inverters in islanded microgrids," Automatica, vol. 49, issue 9, pp. 2603-2611 (Sep. 2013).

He et al., "An islanding microgrid power sharing approach using enhanced virtual impedance control scheme," Power Electronics, IEEE Transactions on, vol. 28, No. 11, pp. 5272-5282, Nov. 2013.

Chandorkar et al., "Control of Parallel Connected Inverters in Standalone ac Supply Systems," IEEE Transactions on Industry Application, vol. 29, No. 1, pp. 136-143 (Jan./Feb. 1993).

Lopes et al., "Defining Control Strategies for MicroGrids Islanded Operation," IEEE Transactions on Power Systems, vol. 21, No. 2, pp. 916-924 (May 2006).

Dragicevic et al., "Supervisory Control of an Adaptive-Droop Regulated DC Microgrid with Battery Management Capability," IEEE Transactions on Power Electronics, vol. 29, No. 2, pp. 695-706 (Feb. 2014).

Dragicevic et al., "A Distributed Control Strategy for Coordination of an Autonomous LVDC Microgrid Based on Power-line Signalling," IEEE Transactions on Industrial Electronics, vol. 61, No. 7, pp. 3313-3326 (Jul. 2014).

Liu et al., "Enhanced Load Power Sharing Accuracy in Droop-Controlled DC Microgrids with Both Mesh and Radial Configurations," Energies 2015, 8, 3591-3605 (Apr. 2015).

Pinomaa et al., "Power-Line Communication-Based Network Architecture for LVDC Distribution System," 2011 IEEE International Symposium on Power Line Communications and Its Applications, pp. 358-363 (Apr. 2011).

Wang et al., Distributed Control for Autonomous Operation of a Three-Port AC/DC/DS Hybrid Microgrid, IEEE Transactions on Industrial Electronics, vol. 62, No. 2, pp. 1279-1290 (Feb. 2015).

* cited by examiner

POWER SHARING FOR DC MICROGRIDS

FIELD OF THE INVENTION

The present invention relates to power sharing, and more particularly, to techniques for power sharing in direct current (DC) networks using virtual impedance frequency droop control by superimposing a small alternating current (AC) voltage on top of the DC voltage.

BACKGROUND OF THE INVENTION

Today, the vast majority of electric energy supplied to end users is transmitted as alternating current or AC. The reasons for this are somewhat historical: in the early days of the grid there were no power electronics and one of the main advantages of AC was that it could easily be converted to high voltage for transmission (at reduced loss), and then reconverted to low voltage for the end user (for increased safety).

There is, however, a growing movement across the energy industry to start using direct current (DC) networks instead of AC networks. There are many strong arguments in favor of this: today's power electronics mean that the original advantages of AC are no longer relevant; at very high voltages, DC transmission is actually more efficient than AC; and at low voltages, DC networks are easier to maintain and have fewer problems (e.g., no harmonics).

However, perhaps the most important argument in favor of DC networks is that the majority of end user loads and sources are actually already DC-based. What is commonly done today is to take locally generated DC power (e.g., from photovoltaic panels) and convert it to AC using inverters. Most of the time, however, the power supply in the end user equipment simply converts the AC it receives back to DC. See, for example, Singh et al., "DC Microgrids and the Virtues of Local Electricity," IEEE Spectrum (posted February 2014).

At the same time, there is a large movement throughout the energy industry towards distributed networks and microgrids. Conventionally, microgrids have used sources like diesel generators to generate AC power. More and more, these applications find it cost effective to instead use a combination of renewables (e.g., solar power) and energy storage to provide their energy needs. These kinds of sources are much better suited to DC.

One challenge in the operation of DC networks, however, is to ensure that there is proper power sharing between sources. Namely, many microgrids will have multiple batteries (or generation sites). If these are at different distances (i.e., different impedances) to the loads that they supply, then due to the nature of electrical networks there will be an uneven amount of power being supplied by different sources. For instance, if a first source and a second source have a distance L1 and L2 respectively to a load, and L2>L1, then due to a greater distance to the load/greater impedance, more power will be drawn from the first source to power the load.

If power sharing between sources is not addressed, then the possible risks/disadvantages involve: decreased stability of the microgrid; uneven discharge (and charge) of energy storage devices; higher rates of aging and replacement for energy storage or distributed generation devices; and unpredictable asset replacement schedules.

Active power sharing problems in DC microgrids are in some ways analogous to the reactive power sharing problem in AC microgrids, as shown in Schiffer et al., "A Consensus-Based Distributed Voltage Control for Reactive Power Sharing in Microgrids," 13th European Control Conference (ECC), pgs. 1299-1305, Strasbourg, France (June 2014). However, most existing methods use external communication infrastructure which can be costly and can introduce vulnerabilities and complexity.

Therefore, there is a strong need for a stable, simple solution to ensure fair power sharing between multiple energy sources in DC networks.

SUMMARY OF THE INVENTION

Provided herein are techniques for power sharing in direct current (DC) networks using virtual impedance frequency droop control by superimposing a small alternating current (AC) voltage on top of the DC voltage. In one aspect of the invention, a method for power sharing in a DC network having multiple electrical energy generation sources connected to at least one load is provided. The method includes the steps of, at each of the electrical energy generation sources: generating a controllable DC voltage; superimposing a controllable alternating current (AC) signal on top of the DC voltage; regulating the AC signal using virtual impedance frequency droop control; and determining a desired DC voltage output using the regulated AC signal. The DC voltage can then be regulated to match the desired DC voltage output.

In another aspect of the invention, a system for power sharing in a DC network is provided. The system includes: multiple electrical energy generation sources connected to at least one load. Each electrical energy generation source includes: a controller configured to control a DC voltage generated by the electrical energy generation source, control an AC signal superimposed on top of the DC voltage by the electrical energy generation source, and regulate the AC signal using virtual impedance frequency droop control; and a processor device for determining a desired DC voltage output using the regulated AC signal.

A more complete understanding of the present invention, as well as further features and advantages of the present invention, will be obtained by reference to the following detailed description and drawings.

DETAILED DESCRIPTION OF PREFERRED EMBODIMENTS

Figure 1:
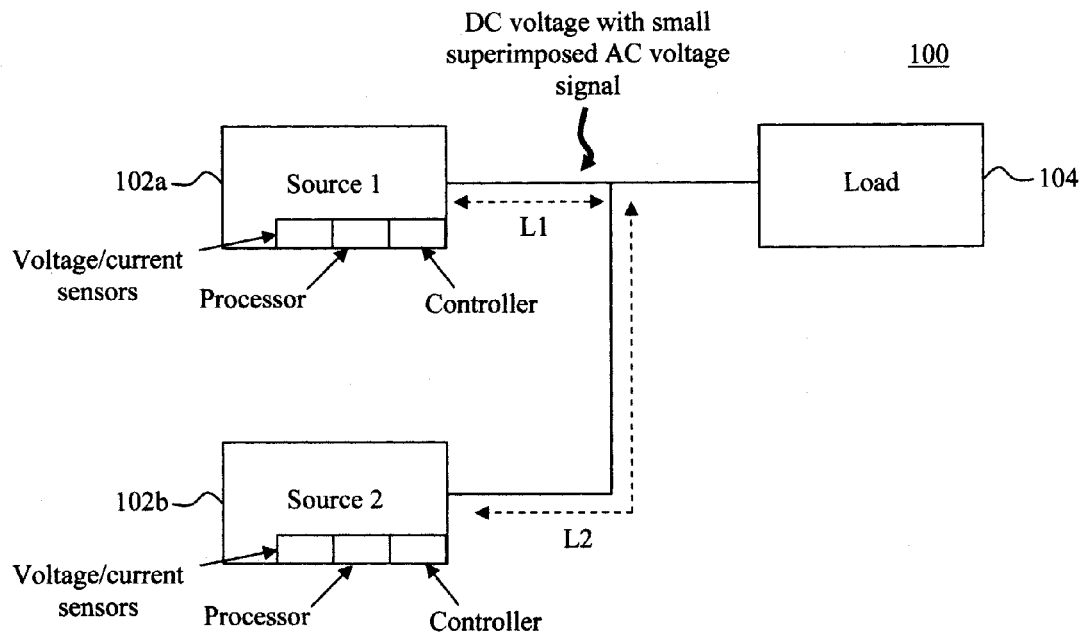
FIG. 1 is a diagram illustrating an exemplary direct current (DC) network according to an embodiment of the present invention.

While the concept of power sharing has been addressed in alternating current or AC networks, a viable solution for power sharing in direct current or DC networks does not currently exist. Advantageously, provided herein are techniques for allowing multiple energy sources in a DC network to provide desired amounts of power to any load(s) in the network that are drawing power. As will be described in detail below, this is achieved by modifying the DC voltage at each energy source by introducing a low amplitude high frequency AC component. This AC component allows frequency droop principles (used throughout AC networks) to be applied to the system. As is known in the art, frequency droop control in AC systems ensures proper real power sharing irrespective of line impedance distribution. See, for example, Simpson-Porco et al., "Synchronization and power sharing for droop-controlled inverters in islanded microgrids," Automatica, vol. 49, issue 9, pgs. 2603-2611 (September 2013) (hereinafter "Simpson-Porco"), the contents of which are incorporated by reference as if fully set forth herein. By way of example only, the amplitude of the AC voltage is a fraction (e.g., from about 0.1% to about 1%, and ranges therebetween) of the DC voltage, and by way of example only, the frequency of the AC voltage could be from about 50 Hz to about 60 Hz, and ranges therebetween.

The present techniques operate on the following principles. In traditional management of the grid, large generators (voltage sources based on rotating machines) have their own large output inductance and transmission lines also have high inductance. This allows for standard control methods (droop control) to be implemented.

In small (low voltage) AC networks, the line impedance is mainly resistive. Inverters (operated as voltage sources), unlike rotating machines, do not have any output inductance. Without inductance, traditional methods like droop control do not work. Therefore, a virtual impedance is introduced as the output inductance of inverters, to ensure that droop control can once again be used.

By contrast, in DC networks, not only is there no inductance, but there is also no sinusoidal voltage signals that the standard (droop) control methods also need. Thus, to apply droop control, both virtual impedance and an AC voltage are needed. Advantageously, the present techniques provide a solution for droop control in DC networks by applying a small AC voltage on top of the existing DC voltage. Together with the virtual impedance in the inverters of the generation sources, this allows for "small scale" droop control.

The small scale droop control ensures power sharing on the AC component but not on the DC component. However, the steady state AC component proportionally reflects the desired power sharing behaviour on the DC side. Therefore, as will be described in detail below, a control mechanism (also referred to herein simply as a "controller") is implemented that takes as input the deviation between the desired DC current (obtained from scaling the AC component) and the DC current currently being output. The controller acts on the DC voltage only. Over a short time, the controller ensures that the desired DC current is achieved. This in turn means that the power sources are providing the right amounts of power according to whatever power sharing scenario is desired.

Thus, by simulating a very low power AC signal on top of the DC signal, power sources throughout the network can adjust their outputs in response to network conditions in such a way that all sources contribute the chosen amounts. The advantages of such an approach include: fair/equal use of all generation assets in the system; improved network stability; decreased aging impacts (no individual source is supplying more than its share); improved maintenance/asset replacement scheduling; no need for expensive and complex communication/control infrastructure to manage the system; robustness: no single point of failure, fully distributed approach; very low power loss from the AC component—the AC component sees a very high load impedance and hence the power loss associated is very low; and it can be used in intervals—reducing the power loss associated with the AC component even further and improving stability.

FIG. 1 is a diagram of an exemplary DC network 100 in which the present techniques may be implemented. As shown in FIG. 1, DC network 100 includes multiple, connected electrical energy generation sources 102a, 102b, etc. operating as voltage sources for a load 104 (which draws power from the sources 102). For simplicity, a single load 104 is shown in FIG. 1. However, the present techniques operate in exactly the same manner described when multiple loads are drawing power from the sources 102. By "connected," it is meant (as shown in FIG. 1) that the power sources 102 are both connected to the same load(s) 104.

By way of example only, the sources 102 can be conventional power generators and/or renewable energy sources, such as solar power sources. The load 104 is representative of many of today's consumer products such as power electronics (e.g., computers, televisions, entertainment devices), solar panels, batteries—including electric vehicles; and a large number of consumer appliances.

As shown in FIG. 1, the load 104 is connected at different distances (L1 and L2) away from the sources 102a and 102b, respectively. As provided above, due to the different distances there are different impedances to the loads that the sources 102 supply. Thus, if unregulated DC power was supplied from sources 102a and 102b to load 104, then more power will be drawn from source 102a since it is closer to load 104 and thus has a lower impedance.

Advantageously, as shown in FIG. 1, a small AC voltage is superimposed on top of the DC voltage which permits the DC voltage from each source 102 to be regulated so as to ensure that the source 104 receives equal amounts of power from each source 102. Namely, as will be described in detail below, each source 102 is capable of locally processing (e.g., via a local processor device) the AC voltage signal and, via virtual impedance based frequency droop control on the AC voltage signal, control (e.g., via a local discrete integral controller) the DC voltage output accordingly. Thus, according to the present techniques, a consistent amount of DC power can be delivered for a load(s) arbitrarily connected at any distance away from the source. As shown in FIG. 1, each source 102 is further outfitted with a voltage and current sensor(s) that can determine the voltage and current output from each of the respective sources 102. Any commercially available voltage and current sensors may be employed in accordance with the present techniques.

As will be described in detail below, the AC signal and DC output from each source 102 is regulated based on AC/DC output determinations made by the local processor device. To make these determinations, the processor device receives data from the sensors (relating to the AC and DC outputs from the source 102). The output determinations from the processor device are then implemented via the controller. Thus, the processor device at each source 102 is capable of exchanging data with both the local sensors and the controller at the source 102.

Figure 2:
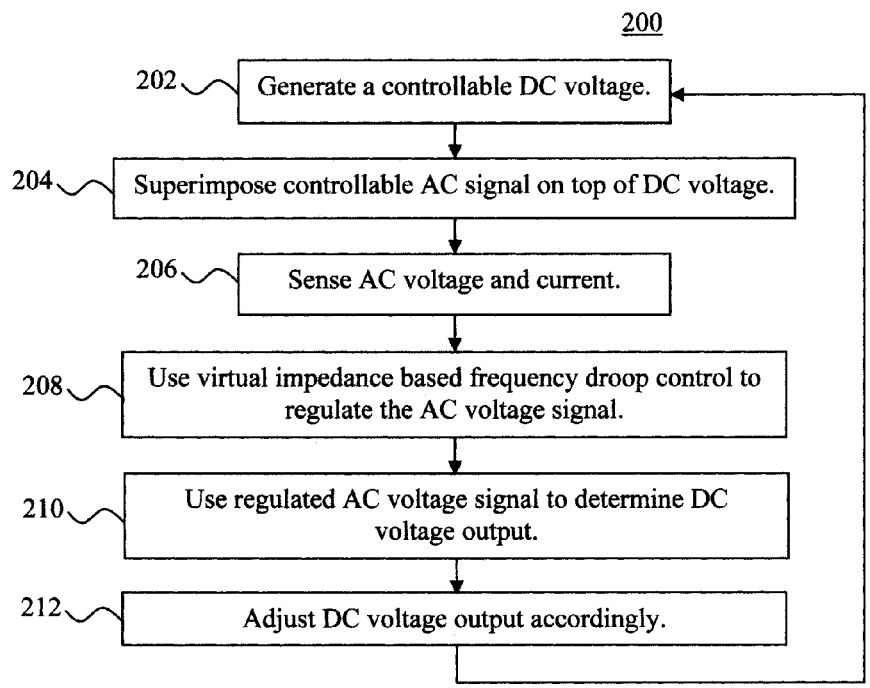
FIG. 2 is a diagram illustrating an exemplary methodology for power sharing in a DC network (such as the DC network in FIG. 1) according to an embodiment of the present invention.

An overview of the present techniques is now provided by way of reference to methodology 200 of FIG. 2. The steps of methodology 200 will be described in the context of DC network 100 of FIG. 1 (i.e., including one or more sources 102 connected to, and operating as a voltage source for, one or more loads 104 which are at arbitrary distances away from the sources). More specifically, methodology 200 is performed by each source 102 in DC network 200.

In step 202, each source 102 generates a controllable DC voltage. Namely, as highlighted above, each source 102 has a controller that is capable of regulating the DC output from the source. Hence the DC output is controllable.

In step 204, each source 102 superimposes a controllable AC voltage signal on top of the DC voltage. Like the DC output, the AC voltage signal output from each source can also be regulated. Hence the AC output is also controllable.

In step 206, each source 102 senses its (local) AC voltage and current. Namely, as highlighted above, each source 102 has current and voltage sensors associated therewith. Therefore, each source can independently determine the voltage and current of its AC output. According to an exemplary embodiment, the local steady state AC current is measured in discrete intervals. The reason for this is that the frequency droop control stabilises after a small transient. During the transient period, the AC currents may fluctuate across a wide range of values. But the magnitude of the steady state current is considerably smaller. It is therefore important to measure the AC current in discrete intervals to avoid the transient stage and use only the steady state current for the power sharing process. The current measurement could also be limited using a saturation block to avoid large deviations that might occur at the discrete time step.

In step 208, based on the AC voltage and current output (from step 206), standard virtual impedance based frequency droop control can be used to regulate the AC voltage signal. See, for example, He et al., "An islanding microgrid power sharing approach using enhanced virtual impedance control scheme," Power Electronics, IEEE Transactions on, vol. 28, no. 11, pp. 5272-5282, November 2013, the contents of which are incorporated by reference as if fully set forth herein. By way of example only, the power sharing between generation sources 102a, 102b, etc. can be carried out according to predetermined power sharing criteria. For instance, power could be shared equally between all sources (every source supplies the same amount of power). Alternatively, another proportional amount could be chosen, for example, source 1 provides twice as much power as source 2 at all times (irrespective of line impedance distribution), etc. The choice of power sharing would depend on the unique system characteristics, the types of sources/batteries involved, etc. and any variety of different power sharing schemes could be implemented herein.

In step 210, the (regulated) AC voltage signal is used to determine the DC voltage needed to achieve a desired DC output. By way of example only, a reference DC current can be computed by scaling the AC current. To use a simple, non-limiting, example to illustrate this principle, say the AC voltage magnitude is 1% as large as the DC voltage—then in that case the measured AC current signal will need to be multiplied by 100 to get the reference DC current. In step 212, the DC voltage output from each source 102 is adjusted accordingly, e.g., via the controllers at each source 102, to match the desired DC output (from step 210).

As shown in FIG. 2, methodology 200 is performed in an iterative manner. Namely, in each iteration, the AC signal and DC output from each of the sources is updated based on the determinations made in the previous iterations. Further, as highlighted above, each source 102 has its own processor device which can be used to implement the present techniques. Thus, for example, at a given iteration of methodology 200, the local processor device determines the DC output and AC signal output that the source 102 generates in steps 202 and 204, respectively. This output determination can be based, for example, on the DC and AC signal output calculations performed in the previous iteration of methodology 200. The sensors and controllers at each source (see above) are employed to implement the DC/AC signal output determined by the local processor device.

Based on feedback from the sensors (in step 206), the processor device can use virtual impedance-based frequency droop control to regulate the AC signal (as per step 208). The local processor device can then use the regulated AC voltage signal to determine the DC voltage output (as per step 210) which can then be implemented (as per step 212) via the controller.

Given the above description of the present techniques, a more detailed technical description of the problem under consideration is now provided:

Droop Control

Typically, DC microgrid sources implement droop control to simultaneously achieve voltage control and power sharing. Traditional voltage droop control in DC networks is as follows:

$$V_x = V_{ref} - m_{x,d} P_x, \tag{1}$$

where $V_{ref}$ is the reference DC voltage, $P_x$ is the power flowing from the xth converter into the network and $m_{x,d}$ is the droop coefficient. Essentially the voltage droop is a local control and the unavailability of local information will hinder the power sharing ability of these systems. So, traditional droop control faces similar power sharing issue unless there is an adaptive power sharing method that manipulates the droop coefficient $m_{x,d}$ or alternatively the virtual line impedance $R_{x,d}$ to facilitate power sharing. These manipulations can be carried out using for example power line signaling or load voltage/source current communication techniques. Power line signaling and communication based droop control techniques are used for generator and load scheduling.

However, it is desirable to have a technique that ensures proper power sharing without requiring communication between sources and also avoiding complex choices of droop coefficients.

Based on principles from oscillator theory and frequency droop control for AC networks (see, e.g., Simpson-Porco), the DC voltage is modified at each source by adding a low amplitude high frequency AC component as shown below:

$$V_x = V_{ref} + v_x - C_x, \tag{2}$$

where $v_x = n_x V_{ref} \sin(\omega_x t)$ is the AC component, $V_x$ is the voltage output at each converter, $V_{ref}$ is the reference DC voltage, $n_x \ll 1$ is the scaling factor that determines the amplitude of the AC component. $\omega_x$ is the frequency of the AC component and $C_x$ is a integral control term whose importance will be made clear below.

Following principles from frequency droop of AC networks the evolution of the AC frequency component is given by, $$\omega_x = \omega_{ref} - m_x P_x \tag{3}$$

$$P_x = \left(\frac{\omega l}{S + \omega l}\right) \bar{P}_x \tag{4}$$

$$\bar{P}_x = v_x i_x, \tag{5}$$

where $\omega_{ref}$ is the rate frequency of the AC component, s is Laplace operator, $m_x$ is the frequency droop (power sharing) coefficient and $p_x$ is the real power associated with the AC component, at the xth converter. It is a well known fact that the frequency droop control in AC systems will ensure proper power sharing irrespective of line impedance distribution. This attribute of the frequency droop controlled system is used as a method to identify the reference power that must be generated locally by each converter. Precisely, the output power $p_x$ and the current associated $i_x$ are measured. The current value is scaled using the reciprocal of the scaling ratio, namely $$\frac{1}{n_x}.$$

This will result in a new current reference which is then tracked by the changing voltage output. The change in the voltage output is carried out using an integral control $C_x$. The DC reference current $I_{ref,x}$ obtained from this process is the reference that the output current $I_x$ has to track. On the other hand it is well known that there is a frequency deviation associated with the frequency droop. While separate communication based techniques can be used for correcting this deviation, it is not important and moreover, unnecessary for the current process. By way of example, the DC voltage can be regulated using an integral controller (e.g., at each of the sources). This process can be summarized by the following equations:

$$C_x = \frac{\alpha_x}{s}(I_{x,avg} - I_{ref,x}) \qquad (6)$$

$$I_{ref,x} = \frac{i_x}{n_x}, \qquad (7)$$

where $C_x$ is the integral control variable at the inverter x and $\alpha_x \ll 1$ is a speed and stability tuning parameter. The control $C_x$ is applied at discrete time intervals to the converter voltage to ensure proper dynamic stability.

Figure 3:
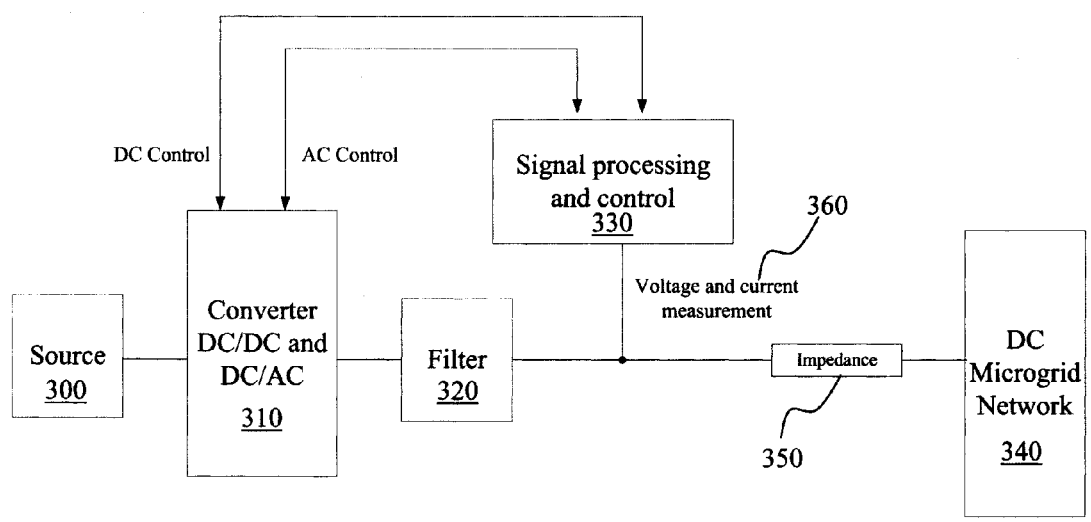
FIG. 3 is a block diagram illustrating an exemplary implementation of the present distributed method that assures accurate power sharing in DC microgrid systems according to an embodiment of the present invention.

Implementation: an exemplary embodiment implementing the present techniques is now described by way of reference to FIG. 3. The DC source shown in FIG. 3 can be a battery, or any other DC generation source, or any AC generation source that has been converted to DC (300), etc. The DC voltage of the source may, in some cases, be converted to another DC voltage for distribution. This is done using the DC/DC interface 310. According to an exemplary embodiment, there is also a very low power rated DC/AC interface. The DC/AC interface here is operated using frequency droop control. According to an exemplary embodiment, a filter 320 is used to remove unwanted harmonics. The signal processing and control block 330 (further described in FIG. 4) uses the voltage and current measurement 360 as inputs. The system is connected to the rest of the microgrid network 340 via a cable that has an impedance 350.

Following the same general flow as methodology 200 (described above), the implementation in this example includes the following steps:

There are output voltage and current sensors that measure the terminal voltage, $V_x$ and the current, $I_x$ flowing through the converter system.

These voltage and current values contain low amplitude AC terms which are denoted by $v_x$ and $i_x$, respectively. These low amplitude terms are obtained using signal processing methods.

The power, $p_x$ associated with the low amplitude terms is obtained using a low pass filter of cut-off frequency $\omega_l$ as shown in Equation (4).

The power $p_x$ is then multiplied by the droop coefficient $m_x$ and this product modifies the frequency amplitude of the low amplitude AC voltage as shown in Equation (3).

On the other hand, the current measurement $i_x$ is divided by the voltage ratio factor $n_x$.

The peak value of the above result acts a reference and the local DC current component of $I_{x,avg}$ is controlled to track this reference value via altering the DC voltage as shown in Equation (2). The term $\alpha_x$ is a gain that controls the speed of tracking. Proper choice of the gain will ensure fast tracking together with a stable system.

Virtual inductance emulation: It is well known that the power—frequency droop control is valid in an AC system with high inductance to resistance $$\left(\frac{X}{R}\right)$$

ratio. But, the cables used in DC systems are very low inductance. Therefore, the principles of virtual impedance emulation must be followed to emulate an output inductance $L_x$ at the output of each converter. Since virtual impedance emulation does not cause any line losses, it can be designed in such a way that the AC subsystem is stable. For a description of virtual impedance emulation see, for example, J. He et al., "An islanding microgrid power sharing approach using enhanced virtual impedance control scheme," Power Electronics, IEEE Transactions on, vol. 28, no. 11, pp. 5272-5282, November 2013, the contents of which are incorporated by reference as if fully set forth herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
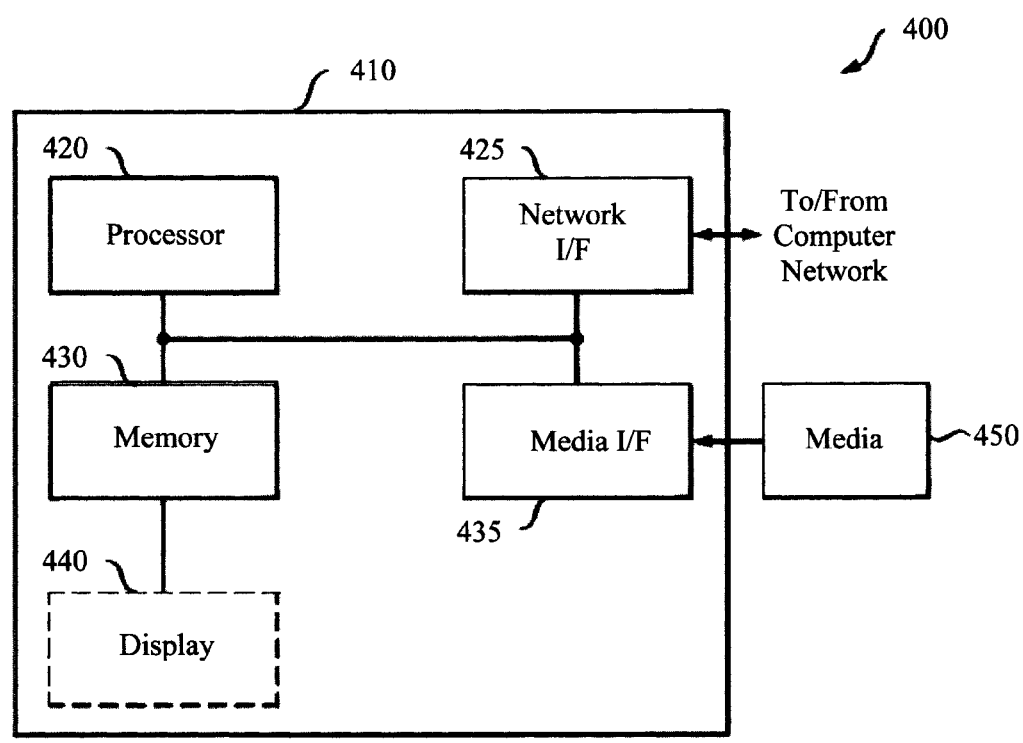
FIG. 4 is a diagram illustrating an exemplary apparatus for performing one or more of the methodologies presented herein according to an embodiment of the present invention.

Turning now to FIG. 4, a block diagram is shown of an apparatus 400 for implementing one or more of the methodologies presented herein. By way of example only, apparatus 400 can be configured to implement one or more of the steps of methodology 200 of FIG. 2.

Apparatus 400 includes a computer system 410 and removable media 450. Computer system 410 includes a processor device 420, a network interface 425, a memory 430, a media interface 435 and an optional display 440. Network interface 425 allows computer system 410 to connect to a network, while media interface 435 allows computer system 410 to interact with media, such as a hard drive or removable media 450.

Processor device 420 can be configured to implement the methods, steps, and functions disclosed herein. The memory 430 could be distributed or local and the processor device 420 could be distributed or singular. The memory 430 could be implemented as an electrical, magnetic or optical memory, or any combination of these or other types of storage devices. Moreover, the term "memory" should be construed broadly enough to encompass any information able to be read from, or written to, an address in the addressable space accessed by processor device 420. With this definition, information on a network, accessible through network interface 425, is still within memory 430 because the processor device 420 can retrieve the information from the network. It should be noted that each distributed processor that makes up processor device 420 generally contains its own addressable memory space. It should also be noted that some or all of computer system 410 can be incorporated into an application-specific or general-use integrated circuit.

Optional display 440 is any type of display suitable for interacting with a human user of apparatus 400. Generally, display 440 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for power sharing in a direct current (DC) network having multiple electrical energy generation sources connected to at least one load, the method comprising the steps of, at each of the electrical energy generation sources:
   generating a controllable DC voltage;
   superimposing a controllable alternating current (AC) signal on top of the DC voltage;
   regulating the AC signal using virtual impedance frequency droop control; and
   determining a desired DC voltage output using the regulated AC signal.

2. The method of claim 1, further comprising the step of:
   regulating the DC voltage to match the desired DC voltage output.

3. The method of claim 1, further comprising the step of:
   performing the generating, superimposing, regulating, and determining steps in an iterative manner.

4. The method of claim 1, wherein at least one of the electrical energy generation sources comprises a battery.

5. The method of claim 1, wherein the at least one load is selected from the group consisting of: power electronics, batteries, consumer appliances, and combinations thereof.

6. The method of claim 1, wherein the at least one load is connected at an arbitrary distance away from each of the electrical energy generation sources.

7. The method of claim 1, wherein the at least one load is connected at a distance L1 from one of the electrical energy generation sources and at a distance L2 from another one of the electrical energy generation sources, wherein L1 is different from L2.

8. The method of claim 1, further comprising the steps of:
   sensing local AC signal current and voltage output; and
   using local AC signal current and voltage output to regulate the AC signal via virtual impedance frequency droop control.

9. The method of claim 1, wherein the desired DC voltage output is based on predetermined power sharing criteria.

10. The method of claim 1, further comprising the step of:
    computing a reference DC current by scaling the AC signal.

11. The method of claim 1, wherein each of the electrical energy generation sources comprises a controller, the method further comprising the step of:
    regulating the DC voltage and the AC signal using the controller.

12. The method of claim 1, wherein each of the electrical energy generation sources comprises a voltage and current sensor, the method further comprising the step of:
    determining an output of the DC voltage and the AC signal using the voltage and current sensor.

13. A system for power sharing in a DC network, the system comprising:
    multiple electrical energy generation sources connected to at least one load, wherein each electrical energy generation source comprises:
    a controller configured to control a DC voltage generated by the electrical energy generation source, control an AC signal superimposed on top of the DC voltage by the electrical energy generation source, and regulate the AC signal using virtual impedance frequency droop control; and
    a processor device for determining a desired DC voltage output using the regulated AC signal.

14. The system of claim 13, wherein the controller is further configured to regulate the DC voltage to match the desired DC voltage output.

15. The system of claim 13, wherein the at least one load is connected at an arbitrary distance away from each of the electrical energy generation sources.

16. The system of claim 13, wherein the at least one load is connected at a distance L1 from one of the electrical energy generation sources and at a distance L2 from another one of the electrical energy generation sources, wherein L1 is different from L2.

17. The system of claim 13, wherein the electrical energy generation source further comprises a sensor configured to sense local AC signal current and voltage output.

18. The system of claim 13, wherein the desired DC voltage output is based on predetermined power sharing criteria.

19. The system of claim 13, wherein the processor device is further configured to compute a reference DC current by scaling the AC signal.

20. The system of claim 13, wherein at least one of the electrical energy generation sources comprises a battery.

* * * * *